United States Patent
Chen (10) Patent No.: US 6,754,070 B2
(45) Date of Patent: Jun. 22, 2004

(54) CAR USE COMPUTER

(75) Inventor: Tonny Chen, Chang-Hua (TW)

(73) Assignee: E-Lead Electronic Co., Ltd., Chang-Hua (TW)

(*) Notice: Subject to any disclaimer, the term of this patent is extended or adjusted under 35 U.S.C. 154(b) by 302 days.

(21) Appl. No.: 10/097,737

(22) Filed: Mar. 15, 2002

(65) Prior Publication Data

US 2003/0174463 A1 Sep. 18, 2003

(51) Int. Cl.$^7$ ................................. G06F 1/16
(52) U.S. Cl. ............... 361/683; 361/681; 248/27.1; 248/917; 307/9.1; 307/10.1; 312/22; 312/223.1; 701/208
(58) Field of Search .................... 361/683, 686, 361/724–727, 680, 681, 679; 248/27.1, 917–924; 307/9.1, 10.1; 312/21–30, 223.1–223.3; 701/1, 33, 208

(56) References Cited

U.S. PATENT DOCUMENTS

| | | | | |
|---|---|---|---|---|
| 5,555,491 A | * | 9/1996 | Tao | 361/686 |
| 5,973,917 A | * | 10/1999 | White | 361/683 |
| 6,049,288 A | * | 4/2000 | Kawasaki | 248/27.1 |
| 6,381,133 B1 | * | 4/2002 | Chen | 361/686 |
| 6,491,276 B1 | * | 12/2002 | Belliveau | 248/920 |
| 2002/0101117 A1 | * | 8/2002 | Shibuya | 307/9.1 |

* cited by examiner

Primary Examiner—Lisa Lea-Edmonds
(74) Attorney, Agent, or Firm—Troxell Law Office PLLC (57) ABSTRACT

An improved car use computer and particularly to a computer adopted for use in a car has a screen panel which has a structure for adjusting the inclined angle of the screen panel. The structure mainly includes a casing, a medium storage and retrieval facility, an incline control means, a frame and a screen panel. Through the incline control means, the inclined angle of the screen panel may be adjusted to suit users' viewing requirements.

12 Claims, 10 Drawing Sheets

CAR USE COMPUTER

BACKGROUND OF THE INVENTION

1. Field of the Invention

The invention relates to an improved car use computer and particularly to a car use computer with a screen panel adjustable to a desired incline angle to facilitate users viewing and reading information on the screen.

2. Description of the Prior Art

Due to continuous technology innovations and progresses, computer developments also have been accelerated and diversified. Nowadays, besides for business use, computers can also be adopted for use in cars to provide drivers required information. Such car computers have increasingly become a standard feature in cars. Drivers can use these high-tech products to avoid stray during driving or traffic jam, and to transmit and receive information. However, to provide information to drivers in the cars, car use computers have some structural problems that often cause inconveniences and troubles to users, notably:

1. A car computer often is located nearby the driver. Conventional screen panels mostly are fixed vertically. Too strong of ambient light could generate light reflection or refraction, and make viewing the computer screen difficult or uncomfortable. The screen panel cannot be adjusted under existing constructions. Hence utilization effect of the car use computer is suffered.
2. Some producers have provided car computers with inclined screen panels. However they mostly are incorporated with car interior structure design and are driven by electric motors. Motions of lifting to the use position and lowering to the nestled position cannot be done rapidly or adjusted to desired angles to meet users' viewing requirements.

SUMMARY OF THE INVENTION

In view of aforesaid disadvantages, the invention aims to provide an improved car use computer that mainly includes a casing, a medium storage and retrieval facility, an incline control means, a frame and a screen panel. The incline control means can control and adjust the inclined angle of the screen panel to suit users' viewing requirements.

Therefore the primary object of the invention is to provide an improved car use computer that has an incline control means to adjust the incline angle of the screen panel of the computer to suit users' viewing requirements.

The foregoing, as well as additional objects, features and advantages of the invention will be more readily apparent from the following detailed description, which proceeds with reference to the accompanying drawings.

DESCRIPTION OF THE PREFERRED EMBODIMENT

Referring to FIGS. 1 through 4, the car use computer according to the invention mainly includes a casing 1, an incline control means 2, a medium storage and retrieval facility 3, a frame 4 and a screen panel 5.

Figure 1:
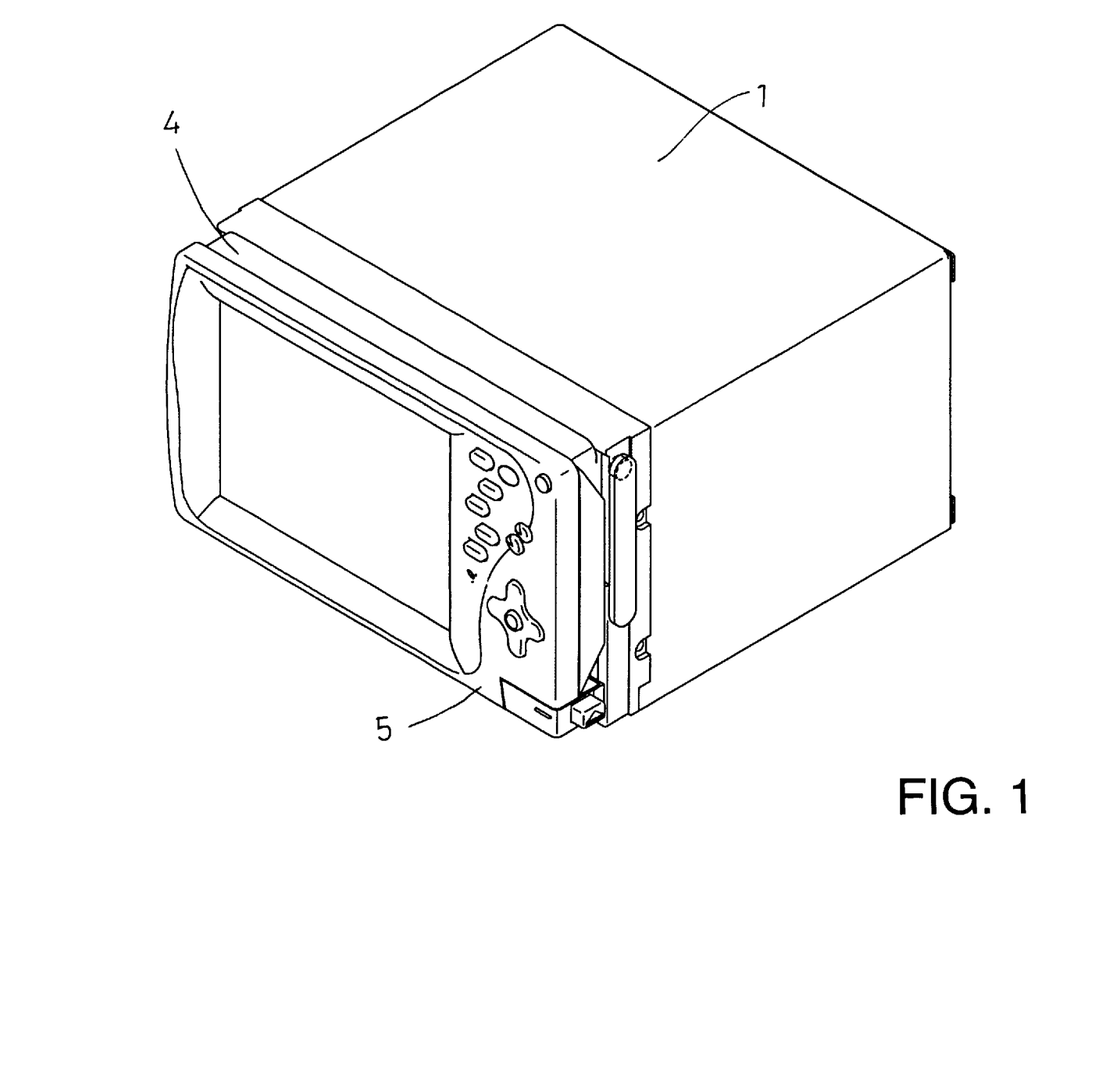
FIG. 1 is a perspective view of the invention.
Figure 2:
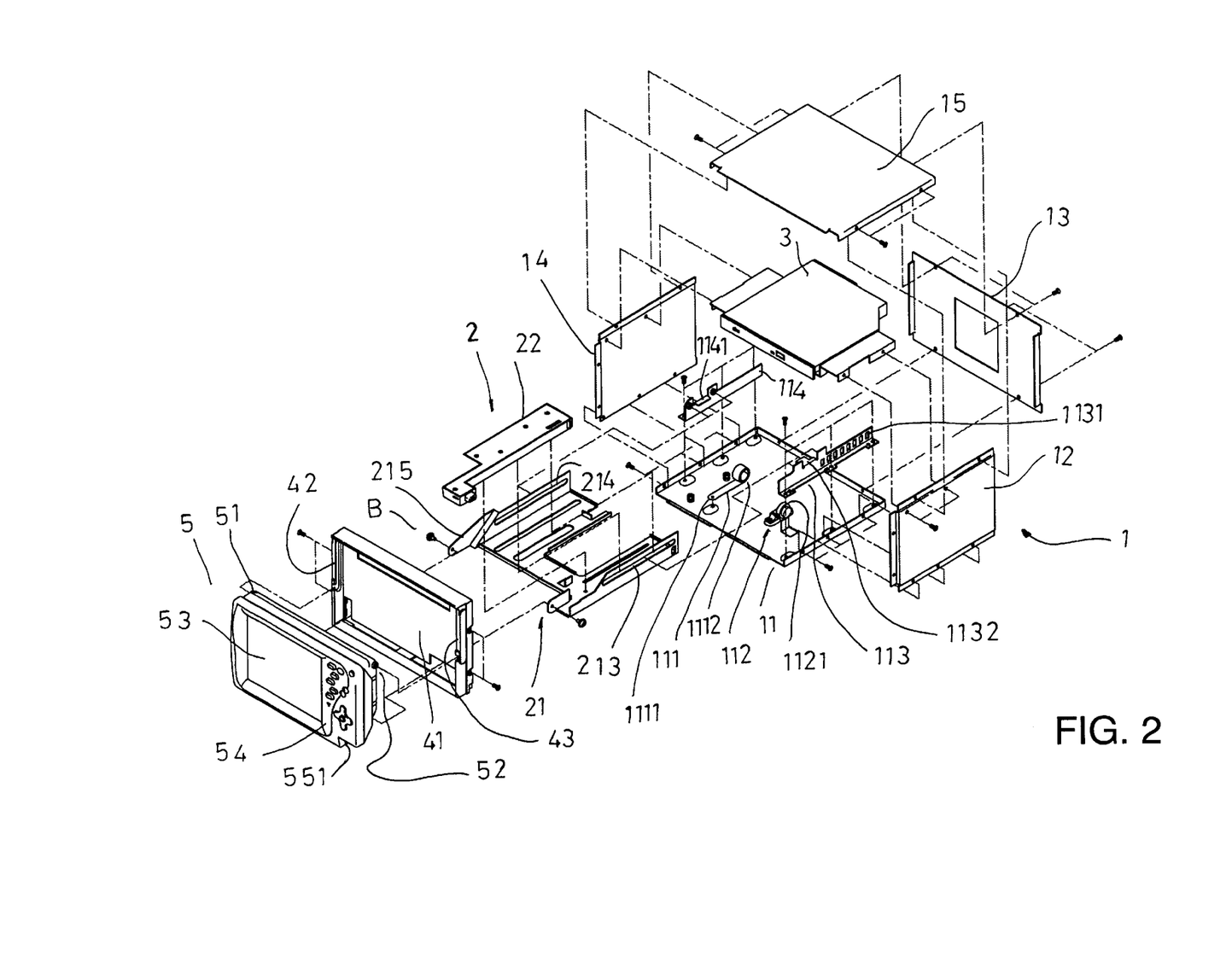
FIG. 2 is an exploded view of the invention.
Figure 3:
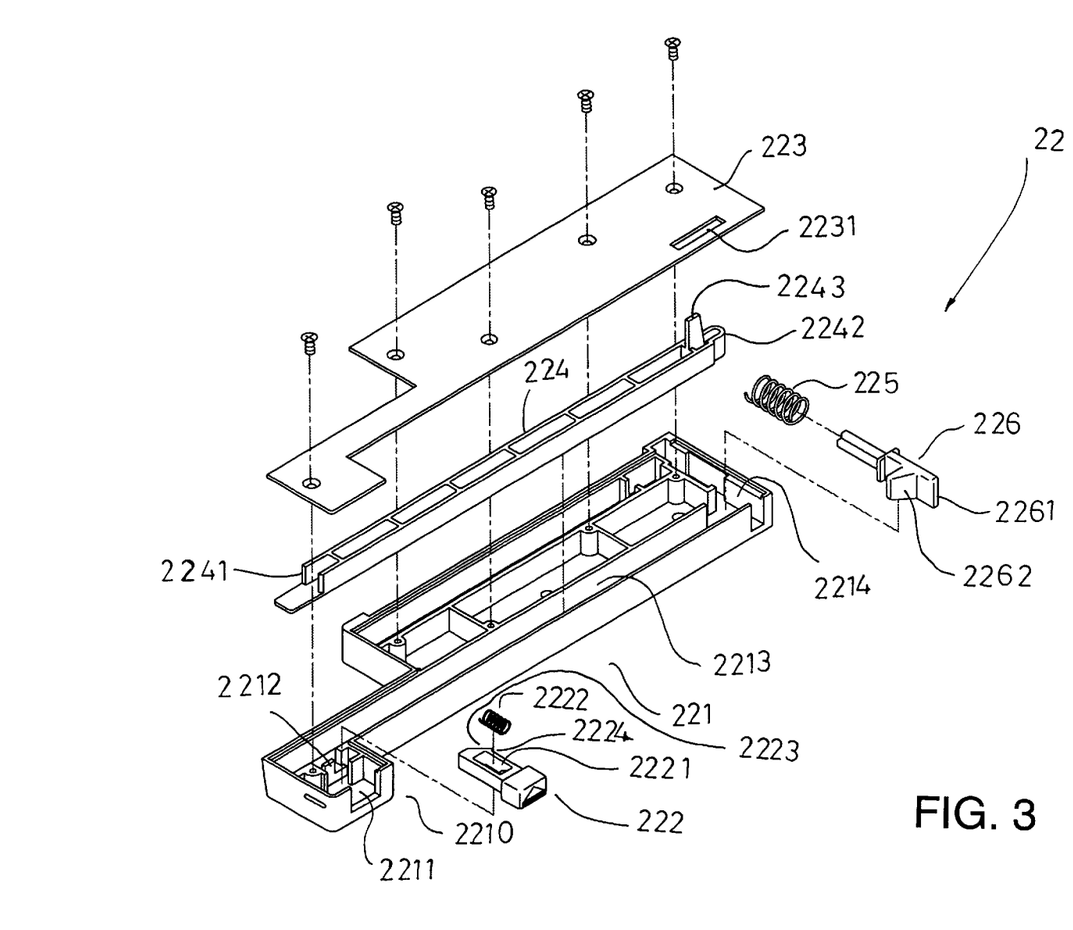
FIG. 3 is an exploded view of a retain box of the invention.
Figure 4:
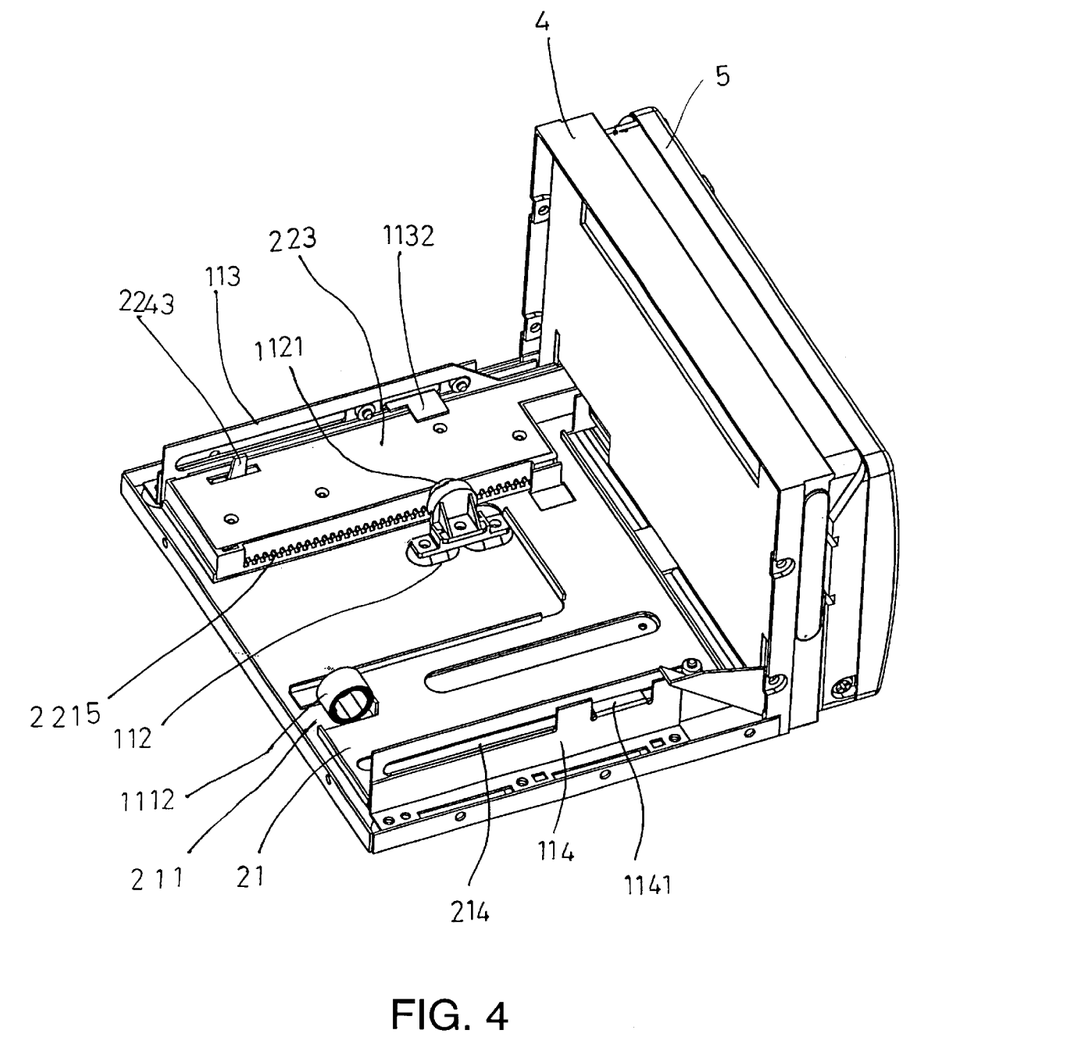
FIG. 4 is another perspective view of the invention.

The casing 1 is hollow and mainly includes a bottom seat 11 surrounding by a right wall 12, a left wall 14, a rear wall 13 and a top wall 15. On the bottom seat 11, there is a torsional spring 111 matching a notch 211 formed on a displacement seat 21. The spring 111 is fixedly mounted to the bottom seat 11 and has one end 1112 winding in normal conditions to push the displacement seat 21. The casing 1 also has a damper 112 located therein. The damper 112 has a wheel 1121 engaging with a gear rack 2215 located on a lateral side of a box case 221 of a retain box 22 (as shown in FIG. 4) to cushion the movement of the incline control means 2. The casing 1 further has a retain plate 113 located on one side of the bottom seat 11 matching the displacement seat 21. The retain plate 113 is formed substantially in a L-shape and has at least one retain slot 1131 formed on the vertical section thereof and a first retain flap 1132 running through a first slide channel 213 of the displacement seat 21. The casing 1 also has a guide plate 114 located on another side of the bottom seat 11 matching the displacement seat 21. The guide plate 114 is also formed substantially in a L-shape and has a second retain flap 1141 formed on a vertical section thereof running through a second slide channel 214 of the displacement seat 21.

The medium storage and retrieval facility 3 is located in an upper section of the casing 1 to serve as the source of viewing information (the medium storage and retrieval facility may be an optical disk drive, a MO, a ZIP and a disk drive).

The frame 4 is a bracket coupling with the casing 1 and has a window opening 41. The frame 4 has a front side to hold the body of the screen panel 5, and two channels 42, 43 located on two lateral sides thereof to couple with stub shafts 51, 52 located on two lateral sides of the screen panel 5 and to set sliding limits for the stub shafts 51, 52.

The screen panel 5 includes at least a screen 53 and an operation key set interface 54. The screen panel 5 has two lateral sides with the stub shafts 51, 52 located thereon and a lower edge which has two lateral ends each has a pivotal aperture 551.

The incline control means 2 includes:

an displacement seat 21 formed substantially in an U-shape with two lateral sides extending upwards to form respectively a vertical section which has the first and second slide channel 213, 214 located thereon. The two lateral sides have respectively a front end extending to form a clipping ledge 215 to couple and engage with the pivotal aperture 551 through a fastening element B;

a retain box 22 located on one side of the displacement seat 21, including:

a box case 221 is covered by a case lid 223 and has a control compartment 2210 located at a front end thereof. Inside the control compartment 2210, there is a key trough 2211 for housing a control key 222, and a retain lug 2212 located at the rear end of the key trough 2211. In the middle section of the box case 221, there is a longitudinal slide channel 2213 for housing a push rod 224. The slide channel 2213 has a front end communicating with the key trough 2211 and a rear end communicating with a hook trough 2214 which may house a spring 225 and a snap hook 226;

a control key 222 which has a chamfer surface 2223 formed on a front end thereof and a straight hook 2224 located on a lower side of the chamfer surface 2223. The control key 222 has a spring trough 2221 formed in the middle section thereof for housing a spring 2222 and receiving the retain lug 2212 of the control compartment 2210 to limit the displacement of the control key 222;

a push rod 224 is an elongated rod housed in the longitudinal slide channel 2213 of the box case 221 of the retain box 22. The push rod 224 has a front end 2241 bucking against the chamfer surface 2223 of the control key 222, and a rear end 2242 bucking against the snap hook 226 for controlling extending or retracting of the snap hook 226. The push rod 224 further has an upright ledge 2243 adjacent to the rear end 2242 extending through a retain slot 2231 formed on the case lid 223 to limit the displacement distance of the push rod 224;

a snap hook 226 has a body coupling with a spring 225 and is housed in the hook trough 2214 of the box case 221 of the retain box 22. The body has an upper section forming a strut 2261 extending outside the box case 221 and inserting in the retain slot 1131 of the retain plate 113. The strut 2261 has a one way slant surface 2262 extending sideward to contact the rear end 2242 of the push rod 224; and a box lid 223 has same shape as the box case 221 to cover the box case 221 and has a retain slot 2231 formed thereon.

Figure 5:
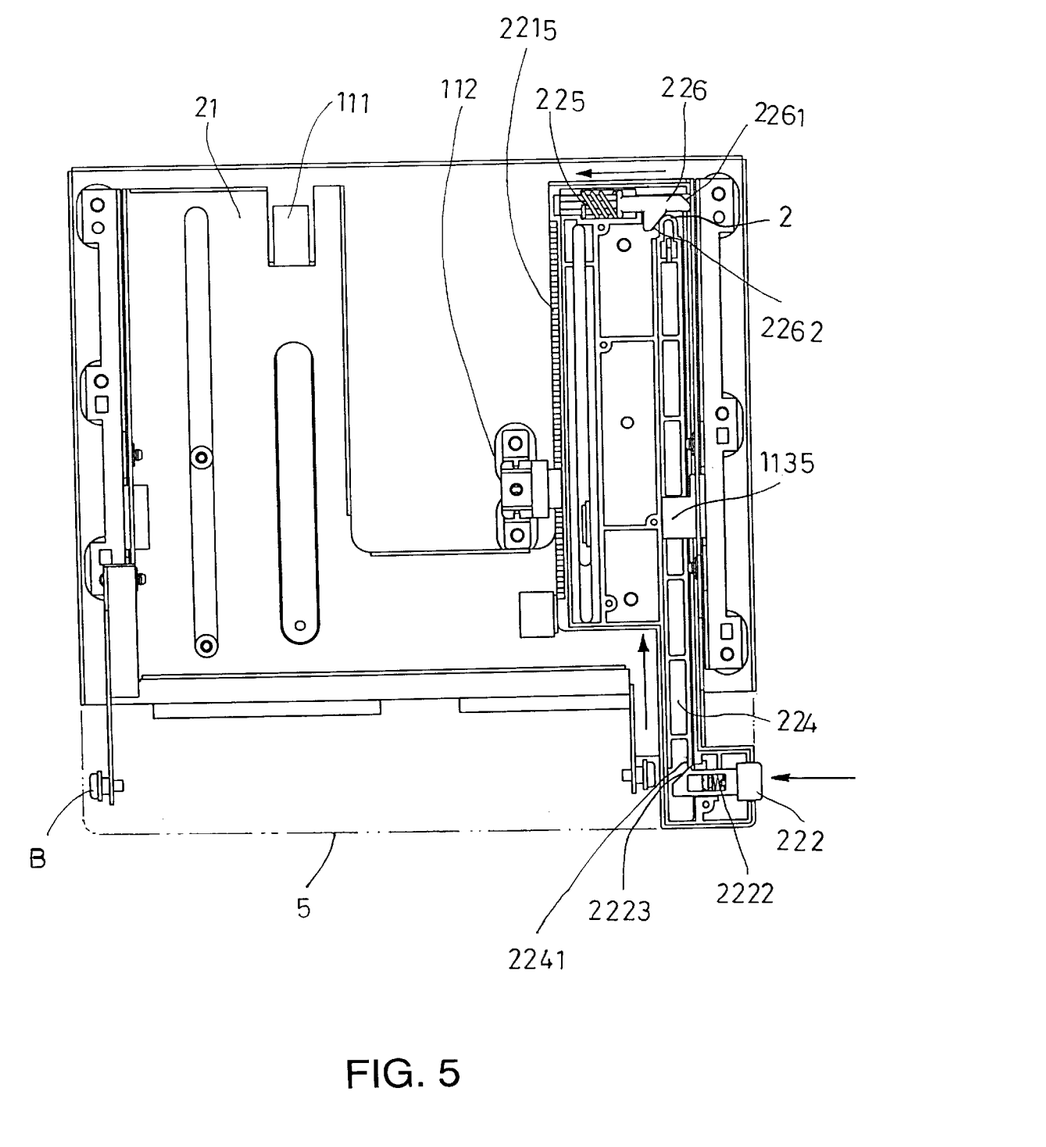
FIG. 5 is a top schematic view of the invention in operation.
Figure 6:
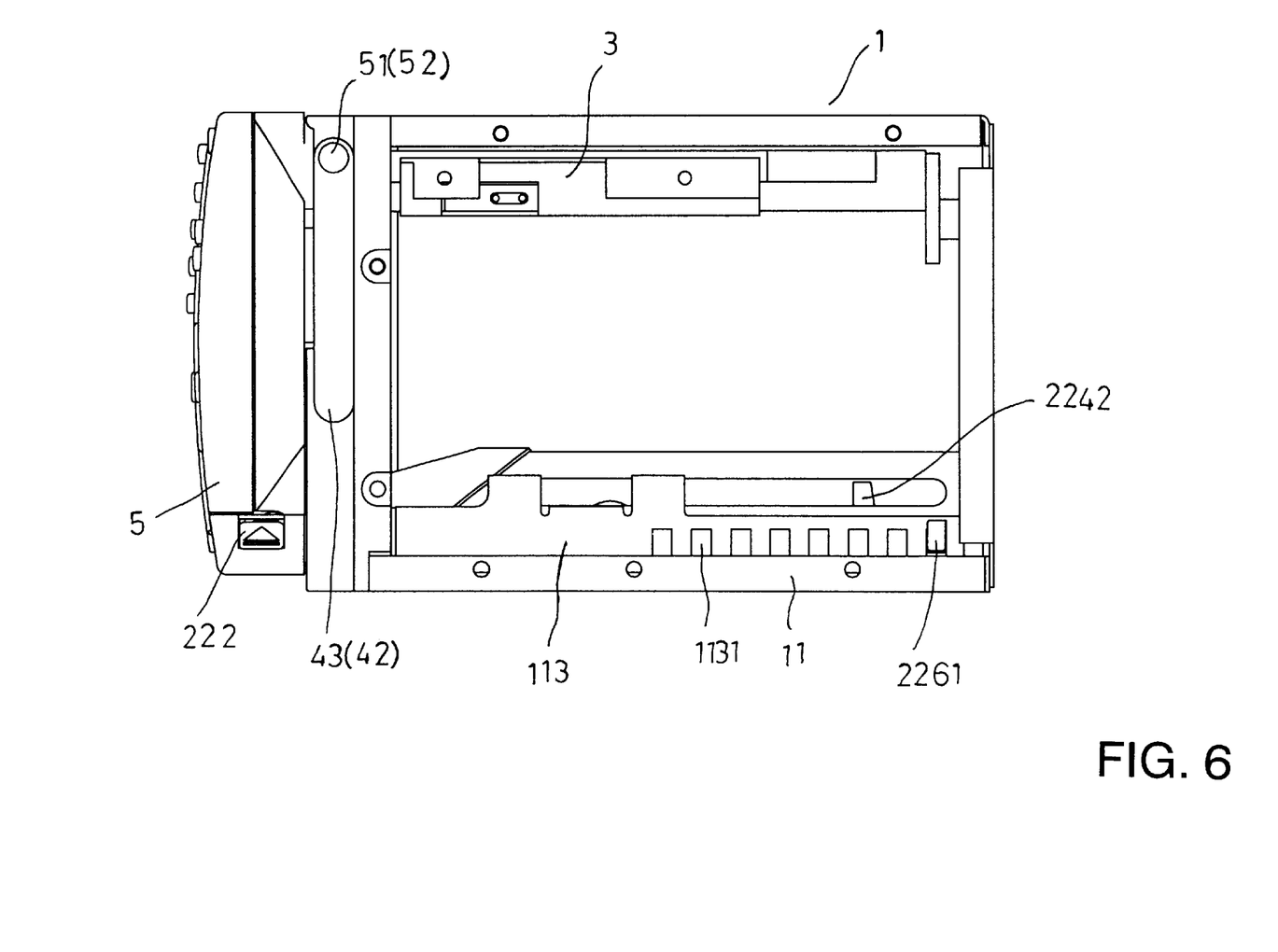
FIG. 6 is a side schematic view of the invention.
Figure 7:
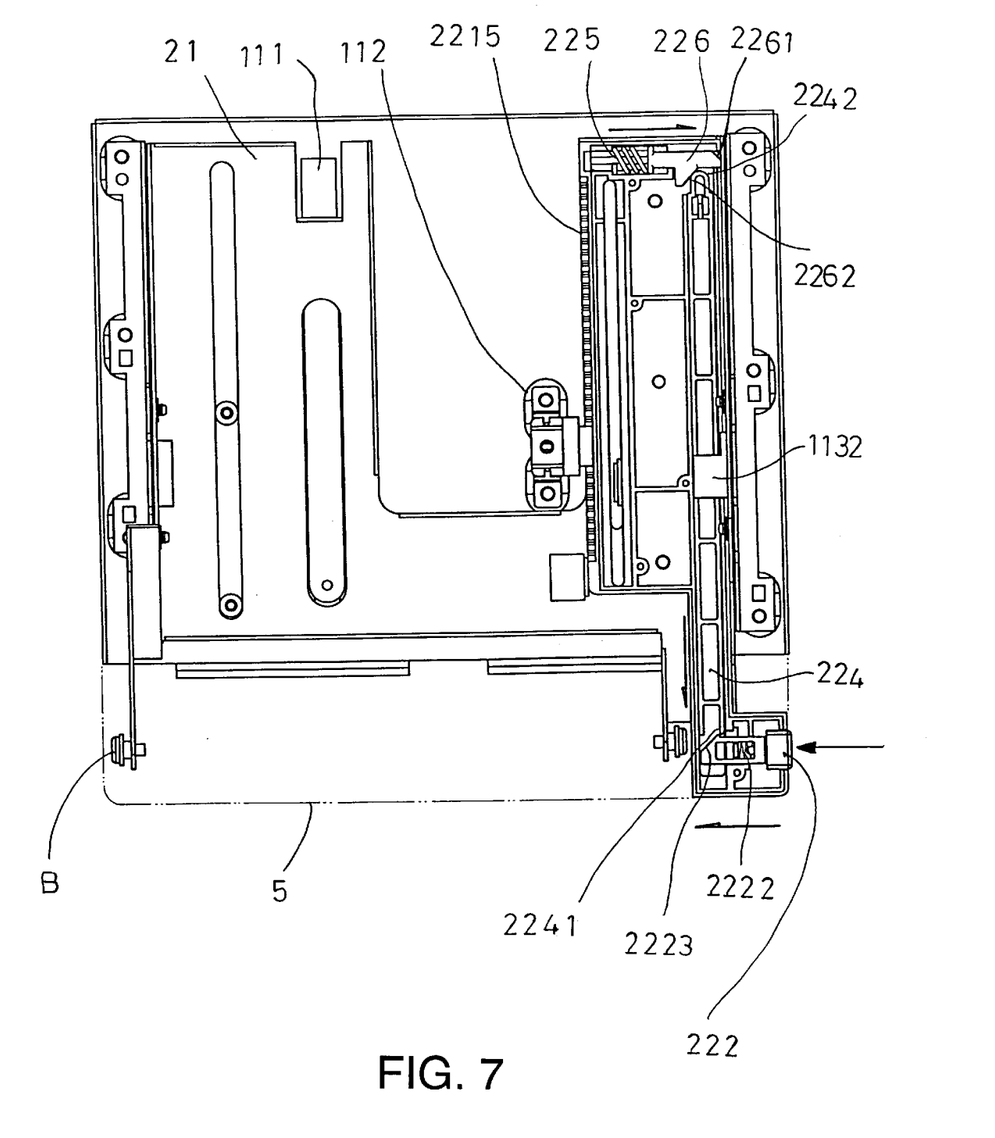
FIG. 7 is another top schematic view of the invention in operation.
Figure 8:
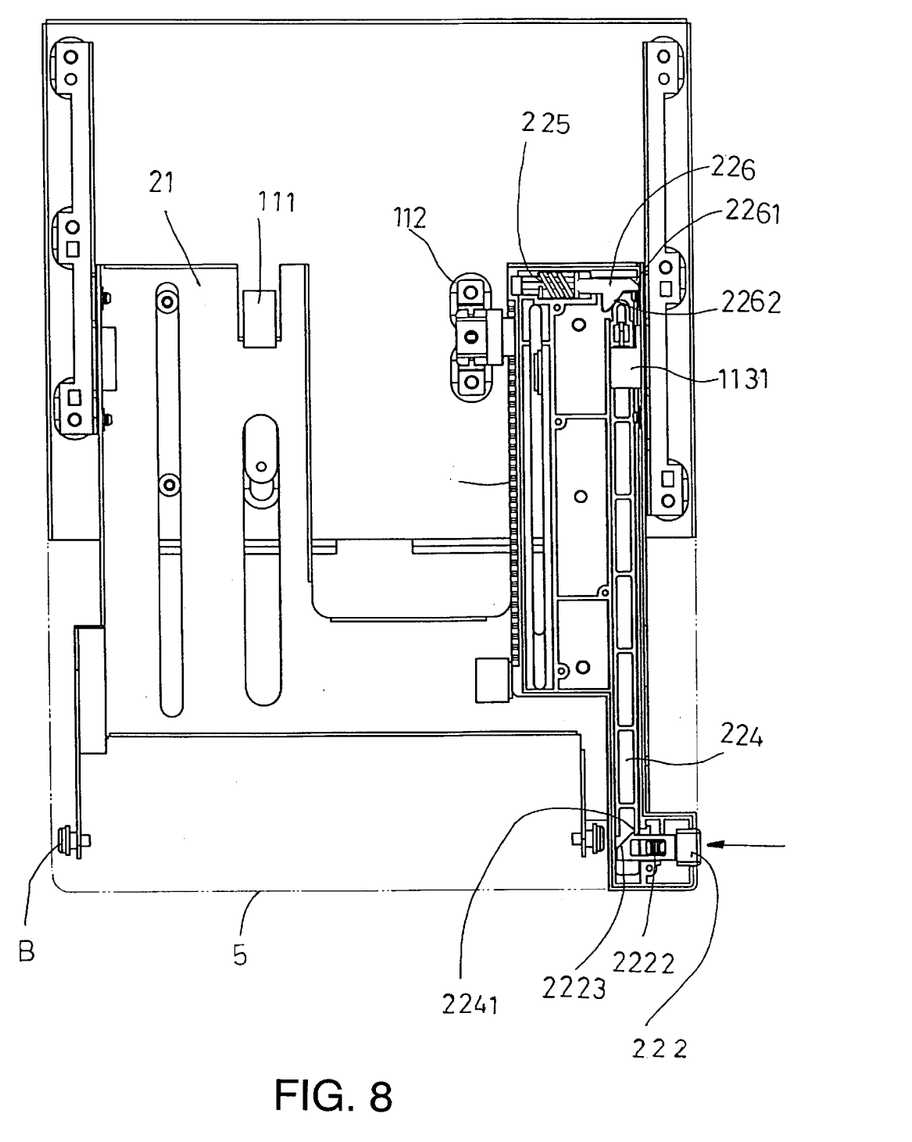
FIG. 8 is yet another top schematic view of the invention in operation.
Figure 9:
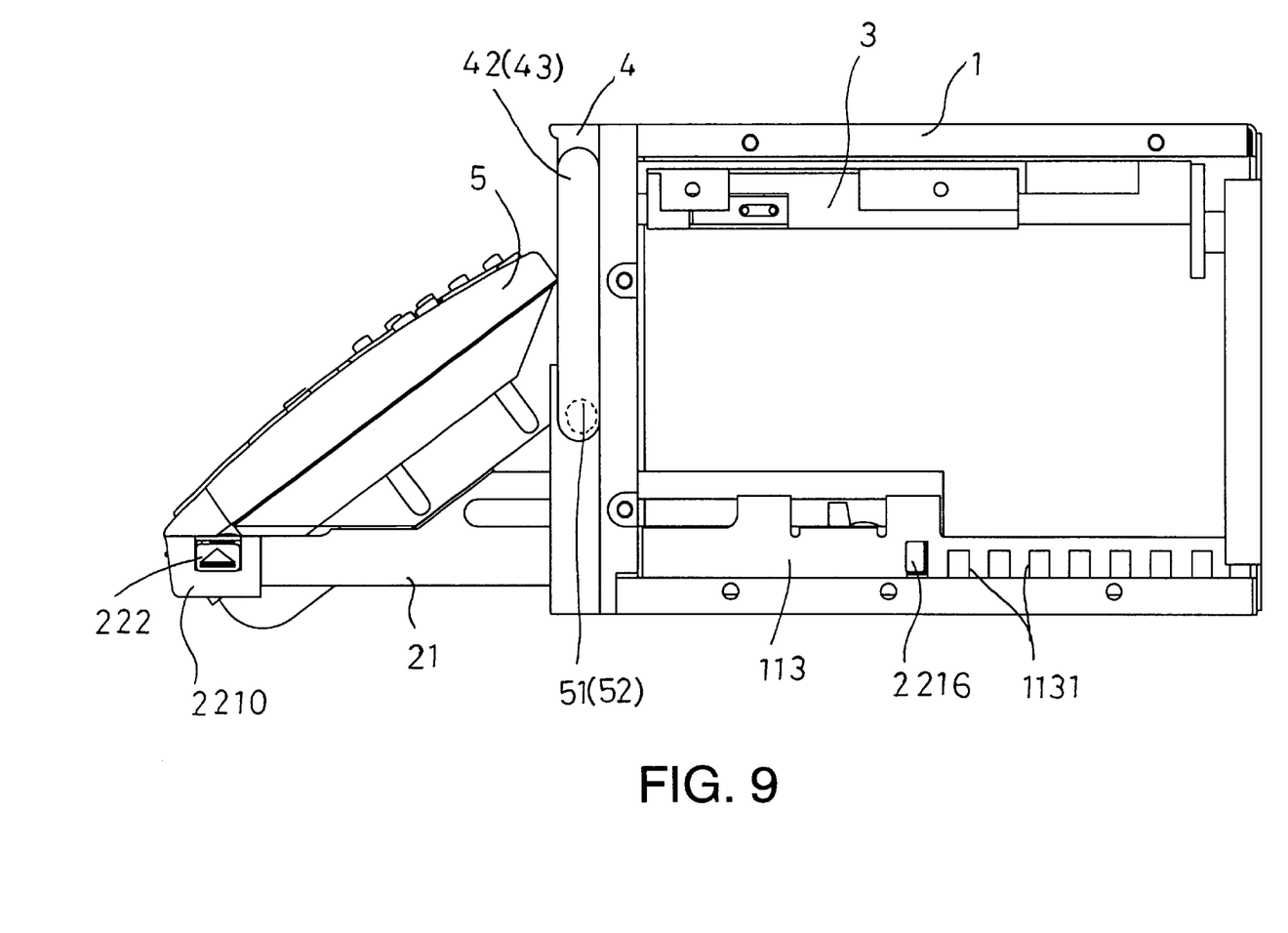
FIG. 9 is a side schematic view of the invention, with the screen panel in an inclined condition.
Figure 10:
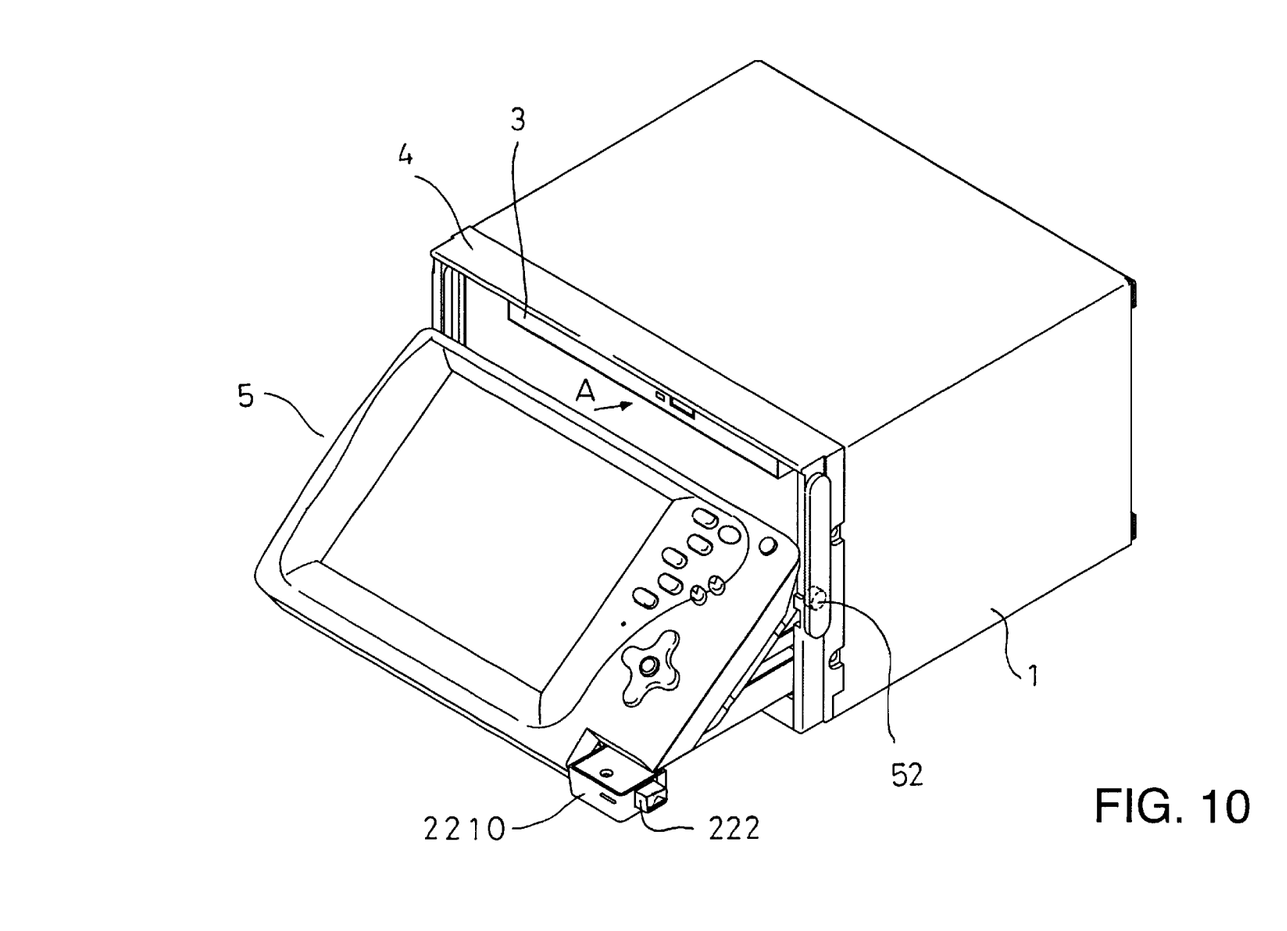
FIG. 10 is a perspective view of the invention, with the screen panel in an inclined condition.

The elements set forth above may be assembled to hold a car use computer. When an user wants to adjust the incline angle of the screen panel 5 of the car computer, or want to replace a carrier element (such as CD) in the medium storage and retrieval facility 3 (referring to FIGS. 5, 6 and 7), the user may directly depress the control key 222. Then the chamfer surface 2223 of the control key 222 pushes the push rod 224 rearwards and moves the snap hook 226 to the left, and the strut 2261 on the snap hook 226 is retracted inside the box case 221 and separated from the retain slot 1131 of the retain plate 113. When the control key 222 is depressed to the bottom and released again, the spring 225 is relieved from the compression of the snap hook 226 and resumes its restoring force to push the snap hook 226 outwards. Consequently, the push rod 224 is moved downwards (as shown in FIG. 7) to latch the straight hook 2224 of the control key 222 such that the control key 222 may be retained without being pushed out, and the strut 2261 of the snap hook 226 cannot latch on the retain slot 1131. Hence the displacement seat 21 may be moved under the restoring force of the torsional spring 111, and the screen panel 5 is moved and slid outwards until reaching the outmost position to form an inclined angle (in the mean time, the side stub shafts 51, 52 of the screen panel 5 are moved synchronously downwards in the slide channels 42, 43 of the frame 4 as shown in FIGS. 8 and 9). When the upright ledge 2243 of the push rod 224 hits the first retain flap 1132 of the retain plate 113, the push rod 224 is pushed and moved upwards and separated from the straight hook 2224 of the control key 222. The spring 2222 is no longer compressed and restores its elastic force to move the control key 222 outwards to its original position (as shown in FIGS. 8 and 9). When the screen panel 5 is inclined, there is a gap A (as shown in FIG. 10 by an arrow mark) formed in an upper section of the frame 4 to allow the user to retrieve and replace the carrier element in the medium storage and retrieval facility 3.

When the screen panel is slid out and inclined at the outmost position, if the user wants to adjust the incline angle or to move the screen panel 5 back for folding, the user needs only to push the screen panel 5 inwards on any spot desired. As the snap hook 226 is relieved, and the strut 2261 on the snap hook 226 has one way slant surface, the inward motion allows the strut 2261 to escape the retain slot 1131 and can prevent the screen panel 5 from sliding outwards. Thus when the user stops pushing the screen panel 5 at any location, the screen panel 5 is stopped and remains at a location corresponding to the retain slot 1131 of the retain plate 113.

By means of the simple construction of the invention set forth above, the inclined angle of the screen panel of a car use computer may be adjusted to suit users requirements, and overcome the inconveniences that might otherwise incur.

I claim:

1. An improved car use computer comprising a casing having an upper section for housing a medium storage and retrieval facility and an exterior for coupling with a frame and a screen panel which is controlled by an incline control means;

wherein the casing has a bottom seat which has two lateral sides respectively forming a retain plate and a guide plate, the retain plate and the guide plate having respectively a first retain flap and a second retain flap running through a first slide channel and a second slide channel located respectively on two vertical sections of two lateral sides of a displacement seat of the incline control means, the displacement seat being pushed in normal conditions by a torsional spring which has one end fixedly anchoring on the bottom seat, the two lateral sides of the displacement seat having respectively a front end extending to form a jutting ledge for pivotally engaging with a pivotal aperture located on a lower side of the screen panel, the screen panel having two lateral sides each having a stub shaft located on an upper section thereof, the stub shaft being housed in a slide channel located on each of two sides of the frame and being controlled by a control key located in a retain box mounted to the displacement seat, the retain box having a longitudinal slide channel for housing a push rod which is controllable by the control key, the push rod bucking a slant surface of a snap hook located in the retain box, the snap hook having a strut located on an upper section thereof movably running through retain slots and moving with the displacement seat for adjusting inclined angles of the screen panel.

2. The improved car use computer of claim 1, wherein the screen panel includes at least a screen and an operation key set interface.

3. The improved car use computer of claim 1, wherein the bottom seat has a damper which has a wheel to engage with a gear rack located on a lateral side of the retain box to cushion movements of the incline control means.

4. The improved car use computer of claim 1, wherein the retain plate has a vertical section which has at least one retain slot formed thereon.

5. The improved car use computer of claim 1, wherein the snap hook has a body coupling with a spring and is housed in a hook trough formed in the retain box.

6. The improved car use computer of claim 1, wherein the push rod is housed in the longitudinal slide channel formed in the retain box, and has a front end bucking a chamfer surface of the control key and a rear end bucking the slant surface formed on the snap hook.

7. The improved car use computer of claim 6, wherein the push rod has an upright ledge located proximate to the rear end thereof to run through a retain slot formed on a case lid for limiting displacement distance of the push rod.

8. The improved car use computer of claim 1, wherein the retain box has a control compartment located on a front end thereof, the control compartment having a key trough for housing the control key.

9. The improved car use computer of claim 8, wherein the key trough has retain lug located on a rear end thereof.

10. The improved car use computer of claim 8, wherein the key trough communicates with the longitudinal slide channel of the retain box.

11. The improved car use computer of claim 8, wherein the control key has a chamfer surface formed on a front end thereof, a spring trough formed on a middle section thereof for housing a spring and the retain lug for controlling displacement of the control key.

12. The improved car use computer of claim 8, wherein the control key has a straight hook located below a lower side of the chamfer surface.

* * * * *